United States Patent
Jha et al.

(10) Patent No.: US 11,590,824 B2
(45) Date of Patent: Feb. 28, 2023

(54) ROOF STRUCTURE AND CAB

(71) Applicant: Deere & Company, Moline, IL (US)

(72) Inventors: Pankaj Kumar Jha, Pune (IN); Jeffrey Gardner, Hudson, IA (US); Gunnar Dietrich, Baden-Baden (DE); Jiri Trhlik, Frankfurt (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/386,649

(22) Filed: Apr. 17, 2019

(65) Prior Publication Data
US 2019/0322322 A1    Oct. 24, 2019

(30) Foreign Application Priority Data

Apr. 20, 2018 (DE) .......................... 102018206111.4
Apr. 16, 2019 (EP) .................................... 19169597
Apr. 16, 2019 (EP) .................................... 19169603

(51) Int. Cl.
*B62D 33/06* (2006.01)
*B60H 1/24* (2006.01)
*B60H 1/00* (2006.01)

(52) U.S. Cl.
CPC .......... *B60H 1/245* (2013.01); *B60H 1/00378* (2013.01); *B62D 33/0617* (2013.01)

(58) Field of Classification Search
CPC ................ B60H 1/245; B60H 1/00378; B60H 2001/00235; B60H 2001/00085; B60H 1/00564; B62D 33/0617

(Continued)

(56) References Cited

U.S. PATENT DOCUMENTS 4,072,487 A * 2/1978 Irwin ................. B60H 1/00378
                                                454/151
4,097,085 A * 6/1978 Nelson ............... B60H 1/00378
                                                180/329

(Continued)

FOREIGN PATENT DOCUMENTS

DE    102016201648 A1    8/2017
EP       0733503 A1      9/1996

(Continued)

OTHER PUBLICATIONS

European Search Report issued in counterpart application No. 19169597.2 dated Sep. 18, 2019. (17 pages).

(Continued)

*Primary Examiner* — Pinel E Romain
(74) *Attorney, Agent, or Firm* — Taft Stettinius & Hollister LLP; Stephen F. Rost (57) ABSTRACT

A roof structure for an agricultural vehicle includes an upper roof assembly, a lower roof assembly, and an air-conditioning chamber formed in the lower roof assembly. The upper roof assembly is connectable to the lower roof assembly to surround the air-conditioning chamber. An inlet chamber and an outlet chamber for air-conditioned air are provided such that the inlet chamber and the outlet chamber between the lower roof assembly and the upper roof assembly include chambers separated from each other. The structure also includes a circulation opening for supplying recirculated air arranged at the inlet chamber and an air-guiding element arranged in the inlet chamber, at the circulation opening, and at the air-conditioning chamber. A region is sealed in relation to an external environment.

19 Claims, 5 Drawing Sheets

(58) Field of Classification Search
USPC .................................................. 296/190.08
See application file for complete search history.

(56) References Cited

U.S. PATENT DOCUMENTS

| | | | |
|---|---|---|---|
| 4,189,987 A | 2/1980 | Amberg et al. | |
| 4,641,502 A * | 2/1987 | Aldrich | B60H 1/00378 454/136 |
| 5,076,821 A | 12/1991 | Bruhnke et al. | |
| 5,310,239 A * | 5/1994 | Koske | B62D 33/0612 180/89.12 |
| 5,484,221 A * | 1/1996 | DeCoux | B62D 25/06 403/203 |
| 5,913,566 A * | 6/1999 | Stauffer | B60N 2/753 296/190.1 |
| 6,178,612 B1 * | 1/2001 | Gernstein | B62D 33/06 29/401.1 |
| 6,223,807 B1 * | 5/2001 | Asche | B60H 1/00378 123/41.49 |
| 6,279,978 B1 * | 8/2001 | Schreyer | B60H 1/247 296/190.03 |
| 6,398,294 B1 * | 6/2002 | Bollweg | B60H 1/00378 296/190.09 |
| 6,719,361 B1 * | 4/2004 | Adams | B62D 33/0612 296/190.01 |
| 6,768,423 B2 * | 7/2004 | Doescher | B60H 1/00978 340/425.5 |
| 6,773,056 B2 * | 8/2004 | Fischer | B62D 33/06 296/190.08 |
| 6,780,097 B2 | 8/2004 | Shuttleworth et al. | |
| 6,883,860 B1 * | 4/2005 | Budge | B62D 33/0612 296/190.02 |
| 6,938,677 B2 * | 9/2005 | Yamakawa | B60H 1/00207 165/42 |
| 7,334,834 B2 * | 2/2008 | Hill | B60H 1/245 296/190.09 |
| 7,338,357 B2 * | 3/2008 | Voit, II | B60H 1/00849 454/158 |
| 7,484,793 B2 | 2/2009 | Baro et al. | |
| 7,726,142 B2 | 6/2010 | Keen | |
| 8,328,608 B2 * | 12/2012 | Kajiya | B60H 1/00471 454/141 |
| 8,403,734 B2 | 3/2013 | Bruss | |
| 8,459,727 B2 * | 6/2013 | Mayr | B60H 1/00207 296/190.09 |
| 8,568,209 B2 | 10/2013 | Boxum | |
| 8,944,199 B2 * | 2/2015 | Fukunaga | B60K 6/40 180/68.5 |
| 9,248,773 B2 | 2/2016 | Sato et al. | |
| 9,643,472 B2 * | 5/2017 | Sakamoto | B60H 1/00028 |
| 9,821,629 B2 | 11/2017 | Thompson et al. | |
| 9,902,233 B2 | 2/2018 | Thompson et al. | |
| 11,305,609 B2 * | 4/2022 | Ferri | B01D 46/44 |
| 2004/0144850 A1 | 7/2004 | Shuttleworth et al. | |
| 2007/0044492 A1 | 3/2007 | Ichikawa et al. | |
| 2007/0205633 A1 * | 9/2007 | Waco | B60H 1/00378 296/190.09 |
| 2012/0003911 A1 * | 1/2012 | Geiss | B60H 1/00378 454/143 |
| 2013/0203333 A1 * | 8/2013 | Amura | B60H 3/0608 454/137 |
| 2013/0244561 A1 | 9/2013 | Bruss et al. | |
| 2014/0216257 A1 | 8/2014 | Knowles | |
| 2014/0345467 A1 | 11/2014 | Viglione et al. | |
| 2015/0140917 A9 * | 5/2015 | Bruss | B60H 1/00378 454/143 |
| 2016/0074794 A1 | 3/2016 | Sudermann et al. | |
| 2018/0178627 A1 * | 6/2018 | Ferri | B60H 1/00378 |
| 2018/0178633 A1 * | 6/2018 | Falagario | B60H 3/0633 |
| 2018/0264912 A1 * | 9/2018 | Hipp-Kalthoff | B60H 1/00535 |
| 2019/0009826 A1 * | 1/2019 | Behnke | B62D 33/0617 |
| 2020/0114724 A1 * | 4/2020 | Chauvel | B60H 3/0625 |

FOREIGN PATENT DOCUMENTS

| | | |
|---|---|---|
| EP | 3176058 A1 | 6/2017 |
| JP | 3579279 B2 | 10/2004 |
| MX | 2013002743 A | 10/2013 |

OTHER PUBLICATIONS

European Search Report issued in application number 19169603.8, dated Sep. 18, 2019, 24 pages.

* cited by examiner

ROOF STRUCTURE AND CAB

RELATED APPLICATIONS

This application claims priority to German Patent Application Ser. No. 102018206111.4, filed Apr. 20, 2018, European Patent Application Ser. No. 19169597.2, filed Apr. 16, 2019, and European Patent Application Ser. No. 19169603.8, filed Apr. 16, 2019, the disclosures of which are hereby incorporated by reference in their entirety.

FIELD OF THE DISCLOSURE

The present disclosure relates to a roof structure and a cab.

BACKGROUND

During the use of an agricultural vehicle such as, for example, a self-propelled field sprayer or a tractor with an attached or fitted spraying device, use is frequently made by spraying in the field of chemical substances, in particular chemical crop protection products including pesticides, herbicides or fungicides. The external environment, including the ambient air, can thereby be loaded with impurities, for example, with dust, aerosols and chemical vapors and gases, with the chemical substances. In order to protect the driver in the cab against impurities of this type, it is known to provide the cab with a filter element, for example, a filter, which filters or cleans the air sucked up from the external environment and outputs the filtered air into the interior of the cab. For example, the standard EN 15695 for protecting the driver of agricultural vehicles provides various categories for cabs, and therefore certain specifications have to be met, depending on the cab category. A cab of category 4 (CAT IV) which describes a cab having high requirements regarding air purity has to be designed, for example, in such a manner that impurities may not pass from the external environment into the interior of the cab. Furthermore, agricultural vehicles are frequently used in hot or cold external temperatures that are unpleasant for the driver, and therefore the air within the cab not only has to be filtered, but also air-conditioned. For this reason, the cab is also provided with an air-conditioning installation for air-conditioning the air in the interior of the cab, for example, with a heater or an air-conditioning-system assembly. The filter installation or the air-conditioning installation can be arranged in particular in a roof structure.

Furthermore, DE 10 2004 004197 A1 discloses a roof structure which is formed in two parts and has a filter element and an air-conditioning installation. The two-part roof structure comprises a lower and upper roof assembly, wherein a sealant is provided at the peripheral connecting points of the lower and upper roof assembly, i.e., at the connecting points facing the external environment, for example, a sealant, in particular a foam- or a putty-based sealant, in order to prevent impurities from penetrating the roof structure. However, two-part roof structures of this type do not meet the category 4 requirements of EN 15695 since the sealant does not adequately seal the interior space of the roof structure and therefore also the interior of the cab. Impurities can thus pass from the external environment into the roof structure or into the interior of the cab, which leads to the driver being directly exposed to the harmful impurities. It has been attempted to solve the above disadvantages by means of a roof structure which consists of a single-part roof structure since, on account of the single-part design of the roof structure, sealant can be substantially dispensed with. However, this solution approach is disadvantageous since the installation of the filter installation and air-conditioning installation, i.e., the laying of lines, hoses and the electrical cabling and also the fitting of the air-conditioning-system assembly and filter, is highly complicated. Furthermore, the maintenance of the filter installation and air-conditioning installation, for example, the repair of a line or the replacement of the air-conditioning-system assembly or of the filter, is virtually impossible in such a single-part structure. The known solution approaches thus lead to a higher outlay on maintenance or put the driver's health at risk.

Proceeding from this, there is a need for a roof structure and a cab which avoids the disadvantages known from the prior art, in particular to provide a roof structure and a cab which avoid the penetrating of impurities into the interior space of the roof structure or the interior of the cab or are configured in a structurally simple manner or have simplified accessibility for maintenance purposes.

SUMMARY

In the present disclosure, a roof structure for an agricultural vehicle includes an upper roof assembly and a lower roof assembly, wherein an air-conditioning chamber is formed in the lower roof assembly. The upper roof assembly is fastenable or coupleable here to the lower roof assembly in order to surround the air-conditioning chamber. Furthermore, the lower roof assembly comprises an inlet chamber and an outlet chamber for air-conditioned air, wherein the inlet chamber and the outlet chamber between the lower roof assembly and the upper roof assembly are designed as chambers which are separated from each other. In addition, a circulation opening for supplying recirculated air is arranged at the inlet chamber. The roof structure comprises an air-guiding element which is arranged in the inlet chamber, wherein the air-guiding element is arranged at the circulation opening and at or in the air-conditioning chamber in such a manner that a region sealed in relation to an external environment is formed.

The agricultural vehicle can be an agricultural tractor unit or harvester, specifically a tractor or a self-propelled field sprayer or the like. However, instead of an agricultural vehicle, the roof structure or cab can also be for a construction machine such as, for example, an excavator or the like. The air-guiding element can additionally also be arranged in the air-conditioning chamber, i.e., partially in the inlet chamber and partially in the air-conditioning chamber. The air-guiding element can be designed as a closed duct or as a tubular body, in particular as a pipe, or can have a U shape. In addition, the air-guiding element can also have chambers, in particular chambers which are adapted to the shape of the inlet chamber or outlet chamber. The shape or the cross section of the air-guiding element can be adapted to the geometry of the lower roof assembly or of the upper roof assembly, i.e., to the geometry of the inlet chamber, the air-conditioning chamber, or of the fresh air opening and of the circulation opening. A sealed region can be understood below as meaning a region within the roof structure that is sealed in relation to the external environment, i.e., in relation to regions within and outside the roof structure, and into which no contaminants can penetrate from the external environment. The sealed region is therefore formed by the air-guiding element itself and the arrangement thereof in the inlet chamber and at the circulation opening or at, in particular in, the air-conditioning chamber.

The lower roof assembly or the upper roof assembly or the air-guiding element can be formed from a plastic or from a metal, such as from a composite material, particularly from a thermosetting or heat-curing composite material. However, the air-guiding element can also be composed of a foam made from plastic. The foam can be a foam made from plastic, e.g., expanded plastic, expanded polypropylene (EPP), expanded polyethylene (EPE), expanded polystyrene (EPS), expanded polyethyleneterephthalate (PET), an expanded biopolymer or polyurethane foam (PUR). Furthermore, the lower roof assembly or the upper roof assembly or the air-guiding element can have a molded part, a rotationally molded part, or a blow-molded part, or else can be a molded part or a rotationally molded part or a blow-molded part. The lower roof assembly or the upper roof assembly or the air-guiding element can also be produced by means of compression molding or roto-molding, for example, rotational sintering, rotational melting, rotational casting, or injection blow molding, double-layer thermoforming or 3D printing. The air-guiding element can be in one piece, i.e., a one-part component, or else in two pieces, i.e., a two-part component, or can be a multi-piece, i.e., a multi-part, component. The two-piece or multi-piece air-guiding element can be connected to one another, for example, welded or adhesively bonded or fastened to one another with a fastening element. A ventilation opening for air-conditioned air can be arranged at or in the outlet chamber. The ventilation opening here can have an air slot or an air grid with which the quantity and the direction of an air flow into the cab can be set precisely or to meet requirements.

The upper roof assembly can comprise the same peripheral profile as the lower roof assembly, and therefore the upper roof assembly can be adapted or shaped in a complementary manner to the lower roof assembly in order to surround or to cover the inlet chamber, outlet chamber and air-conditioning chamber. In particular, the inlet chamber, the outlet chamber and the air-conditioning chamber can be designed as chambers which are spatially separated from one another between the lower and upper roof assembly. The air-guiding element in turn can form a sealed region at least in the inlet chamber or partially or completely at or in the air-conditioning chamber. Furthermore, the upper roof assembly can comprise a removable access panel, designed, for example, in the form of a sheet, in order to permit maintenance or repair of the components of the air-conditioning installation. In addition, a covering can be fastenable to the outlet chamber, as a result of which insulation of the outlet chamber in relation to the upper roof assembly is achieved. The roof structure can also comprises a further inlet chamber or a further outlet chamber, in particular a first and second inlet chamber or a first and second outlet chamber. The first and second inlet chamber and the first and second outlet chamber can be arranged diametrically or mirror-symmetrically with respect to the air-conditioning chamber.

Under some circumstances, it can be required to provide a sealant or an insulation material between the upper and lower roof assemblies in the roof structure. In addition, the upper and lower roof assemblies can be fastened to each other with fastening means or with adhesive means. In addition, a seal, in particular a sealant or putty, can be used at the outer connecting points of the lower and upper roof assembly in order to configure the assembled roof structure to be waterproof. A foam seal or foam insulation can be provided for sealing between the roof assemblies or for sealing of the optional coverings. A foam seal can also be provided in the roof structure in order to prevent air movements in regions in which air is provided for insulation purposes.

On account of the arrangement of the air-guiding element in the roof structure and by means of the air-guiding element itself, a region which is sealed in relation to the external environment is formed in the roof structure. No impurities from the external environment, in particular no impurities from the ambient air, pass into the sealed region. On account of the sealed region, the recirculated air supplied from the cab via the circulation opening is kept free from impurities from the external environment. It is therefore possible to prevent impurities from penetrating at the outer connecting points of the lower and upper roof assembly, in particular if the sealant has a leakage, into the roof structure or the air-guiding element and into the air circuit, i.e., the air-guiding region, and therefore from passing via the air-conditioning chamber or outlet chamber into the cab. It is thereby ensured that the driver in the interior of the cab is not directly exposed to harmful impurities and the driver's health is not put at risk by breathing in unfiltered ambient air loaded with harmful impurities. Furthermore, because of the simple structural arrangement of the air-guiding element in the roof structure and the simple configuration of the roof structure, simple access to the installations and components which are arranged or can be arranged in the roof structure is continued to be ensured. Maintenance work to the roof structure can therefore be carried out in a simple manner, and at the same time the category 4 requirements of EN 15695 can be met.

In a further embodiment, a fresh air opening for supplying fresh air is formed at, in particular in, the inlet chamber or at, in particular in, the air-conditioning chamber. The air-guiding element is arranged at the fresh air opening and at the circulation opening and at, in particular in, the air-conditioning chamber in such a manner that a region sealed in relation to an external environment is formed. The inlet chamber can therefore comprise the fresh air opening and the circulation opening, and the fresh air opening and the circulation opening in the lower roof assembly can be formed at or in the inlet chamber. However, the inlet chamber can likewise also comprise the circulation opening and the air-conditioning chamber the fresh air opening, and the circulation opening in the lower roof assembly can be formed at or in the inlet chamber and the fresh air opening in the lower roof assembly at or in the air-conditioning chamber. The further inlet chamber can comprise a further fresh air opening for supplying fresh air and a further circulation opening for supplying recirculated air. The air-conditioning chamber can also comprise a further fresh air opening for supplying fresh air. The circulation opening can be arranged adjacent to or opposite the fresh air opening. The sealed region is therefore formed by the air-guiding element itself and by the arrangement thereof in the inlet chamber, at the fresh air opening and the circulation opening and at, in particular in, the air-conditioning chamber. On account of the sealed region, the fresh air supplied via the fresh air opening and the recirculated air supplied from the cab via the circulation opening is kept free from impurities from the external environment. It is therefore possible to prevent impurities from penetrating the roof structure and from passing into the air circuit and therefore via the air-conditioning chamber or outlet chamber into the cab.

In a further embodiment, the air-guiding element has a fresh air inlet for supplying fresh air and a circulation inlet for supplying recirculated air and an air outlet for letting out a mixture of fresh air and recirculated air. The fresh air opening is connected here to the fresh air inlet and the circulation opening to the circulation inlet in such a manner, and the air outlet is arranged at the air-conditioning chamber in such a manner, that the fresh air and the recirculated air can be mixed in the air-guiding element and the mixture of fresh air and recirculated air can be guided in the sealed region from the fresh air opening and the circulation opening to the air outlet, in particular also from the air outlet into the air-conditioning chamber. The fresh air opening can be connected in a communicating manner, i.e., connected in terms of flow, to the fresh air inlet and the circulation opening can be connected in a communicating manner, i.e., connected in terms of flow, to the circulation inlet, and these two openings in turn can be connected in a communicating manner, i.e., connected in terms of flow, to the air outlet and to the air-conditioning chamber. The fresh air can therefore be supplied to the air-guiding element via the fresh air opening and the fresh air inlet, and the recirculated air via the circulation opening and the circulation inlet.

The fresh air and the recirculated air can be mixed in the air-guiding element and can be supplied to the air-conditioning chamber by means of the air outlet. The air outlet can be arranged here at or in the air-conditioning chamber. The air-guiding element can have one, two or more fresh air inlets and one, two or more circulation inlets, in particular if the roof structure comprises two or more inlet chambers each having a fresh air opening and a circulation opening. The roof structure can also comprise two or more air outlets; the roof structure comprises the same number of inlet chambers and outlet chambers. The two or more inlet chambers and outlet chambers can be designed as chambers which are separated spatially from each other between the lower and upper roof assembly. The air-guiding element can have one, two or more fresh air inlets or one, two or more circulation inlets. The roof structure can also comprise two or more air outlets. In each case, one fresh air opening can be connected here to one fresh air inlet and in each case one circulation opening can be connected to one circulation inlet. The fresh air openings and the circulation openings can be connected here in a communicating manner, i.e., connected in terms of flow, to the one or more air outlets via the fresh air inlets and the circulation inlets. The fresh air opening can be fixedly or releasably connected to the fresh air inlet and the circulation opening can be fixedly or releasably connected to the circulation inlet or the openings can be fastened to each other or the connecting points can be sealed. It is therefore possible to prevent the driver in the interior of the cab from being directly exposed to harmful impurities and the driver's health from being put at risk by breathing in unfiltered ambient air loaded with harmful impurities.

In yet another embodiment, a filter arrangement, in particular with a first filter element, is arranged at the fresh air opening or at the fresh air inlet. The filter arrangement can be fixedly or releasably connected or coupled to the fresh air inlet or to the fresh air opening or else fastened thereto. The filter arrangement can comprise a line or a first filter element or a holder with a fastening element, in order to hold or to fasten the filter arrangement, in particular the first filter element, or a first fan. The first fan can have a first fan inlet and a first fan outlet. The first fan inlet can suck up fresh air from the first filter element or the first fan outlet can discharge air into the outlet chamber. The first filter element can comprise at least one filter. In a first example, the filter arrangement can comprise only the first filter element. In this case, the first filter element can be arranged at the fresh air inlet or the fresh air opening, can be connected or coupled thereto or fastened thereto. The lower roof assembly can then comprise a shaped fresh air duct which can be arranged in the outer periphery of the lower roof assembly, i.e., the area which is oriented in the direction of the cab. The fresh air duct can be surrounded or covered by a removable dust collection device or an inlet grid. The fresh air opening can likewise be arranged at or along the outer periphery of the lower roof assembly, and in particular can also be surrounded by the fresh air duct. The first filter element can be removably adapted to the fresh air duct. Fresh air can therefore be sucked up through the inlet grid and passes through the first filter element before the fresh air can be supplied to the air-guiding element.

In a second example, the filter arrangement can comprise at least the line and the first filter element and a holder with a fastening element and optionally the first fan. In this case, the line can be releasably connected or coupled to the fresh air inlet or to the fresh air opening. In addition, the first filter element can be arranged outside the roof structure, for example, at a cab, in particular can be fixedly or releasably fastened to the cab by means of the holding element or can be fixedly or releasably connected to the cab. This ensures that the first filter element, in particular in the two cases, can be changed in a simple manner and an unnecessary outlay on maintenance is avoided. As a result, in particular in the second case, the front area of the first filter element and thus the air flow into the roof structure or the pressure in the cab can be increased. Furthermore, the category 4 requirements can thus be met with just one pressure regulator. In addition, the motor of the fan is self-cooling, and further fans, in particular in the roof structure, can be omitted, which reduces the noise level and the structural complexity.

In another embodiment, a second filter element is removably arranged at the circulation opening or at the circulation inlet. The second filter element can comprise at least one filter. This ensures that the second filter element can be changed in a simple manner and an unnecessary outlay on maintenance is avoided.

In a further embodiment, either the filter arrangement (i.e., the line) and the air-guiding element (i.e., the fresh air inlet) or the filter arrangement (i.e., the line), and the roof structure (i.e., the fresh air opening) are connected by means of a coupling element. The filter arrangement can therefore be fixedly or releasably connected by means of the coupling element to the fresh air inlet or to the roof structure or fresh air opening or fastened thereto. The coupling element makes it possible for the fresh air to be able to be introduced uniformly into the roof structure. As a result, the recirculation zone, i.e., the region in the air-guiding element in which fresh air and recirculated air are mixed, can be reduced to a minimum, and therefore the pressure in the cab is increased.

In yet a further embodiment, the air-guiding element comprises a cable duct. In an advantageous manner, one or more connecting lines, in particular lines for the heater or the heat exchanger, i.e., electrical lines or air-conditioning lines or pipes, can be arranged in the cable duct on the air-guiding element (i.e., from or to the air-conditioning chamber) through the inlet chamber towards an aperture formed in the lower roof assembly. This measure prevents connecting lines from running in the sealed region and, for example, in the event of leakage of the connecting lines, prevents impurities from passing into the sealed region. Furthermore, the connecting lines in the cable duct are accessible in a simple manner and can therefore be maintained in a simple manner.

In another embodiment, a second fan can be arranged or is arranged in the air-conditioning chamber or in the outlet chamber in the roof structure. It is also possible for an air-conditioning-system assembly to be able to be arranged or to be arranged in the air-conditioning chamber or at the outlet chamber. The second fan here has a second fan inlet and a second fan outlet, wherein the second fan inlet sucks up air from the air-conditioning chamber or the second fan outlet discharges air into the outlet chamber or from the air-guiding element. The air outlet can be arranged at the air-conditioning-system assembly. The air outlet can be fixedly or releasably connected to an air-conditioning inlet of the air-conditioning-system assembly or can be fastened to one another or the connecting points can be sealed. The second fan can either be arranged in the air-conditioning chamber or in the outlet chamber, in particular in a fan receptacle in the air-conditioning chamber or in the outlet chamber. The fan receptacle is designed for receiving or for the fastening of the second fan. The second fan can also be partially arranged in the air-conditioning chamber and the outlet chamber, wherein the fan receptacle can then be partially arranged in the air-conditioning chamber and the outlet chamber. In particular, it is possible for two second fans to be provided and able to be arranged or arranged in the roof structure, in particular to be able to be arranged or arranged in one fan receptacle each.

The air-conditioning-system assembly can be arranged on the air-guiding element, such as fixedly or releasably connected thereto or fastened thereto, in such a manner that the mixture of fresh air and recirculated air can be guided or can flow from the air-guiding element into the air-conditioning-system assembly and from the air-conditioning-system assembly into the air-conditioning chamber or outlet chamber. The air-conditioning-system assembly can comprise a heat exchanger, in particular an evaporator or a heating assembly or a heater, in particular can have heating or cooling elements in order to provide both a heating function and a cooling function. The air-conditioning-system assembly can be arranged in particular at or in the air-conditioning chamber, which is designed for receiving or for the fastening of the air-conditioning-system assembly, or at the outlet chamber. A pressure gradient can thus be generated in the roof structure, such as in the air-guiding element or in the air-conditioning chamber or in the outlet chamber. Furthermore, the mixture of fresh air and recirculated air from the sealed region can be guided directly to the air-conditioning-system assembly, such as directly to the evaporator or to the heater. In addition, the present disclosure relates to a cab for an agricultural vehicle having a roof structure.

In a further embodiment of the present disclosure, the cab may include at least one side wall and the roof structure with a filter arrangement. The filter arrangement can comprise a holder with a fastening element, and the holder can hold the filter arrangement, e.g., the first filter element, or the filter arrangement is fastenable or can be fastened to the roof structure or the side wall by means of the fastening element.

The roof structure, in particular the assembled roof structure, can be used as a roof of the cab. The rest of the cab can be formed by a floor or one or more side walls, in particular also by a frame. The side walls can be connected to the roof structure, e.g., to the lower roof assembly, particularly between the fresh air opening and the circulation opening, or can be sealed. The side walls can have metal, plastic or glass elements which are connected to the roof structure via customary means.

Overall, the course of the air flow in the roof structure can be described as follows. In the air-guiding element there is a pressure gradient, i.e., positive or negative pressure, which is generated by the first or second fan. The fresh air, which can be sucked up via the filter arrangement through the fresh air opening or fresh air inlet in a filtered manner into the air-guiding element, and the recirculated air, which can be sucked up in particular via the second filter element through the circulation opening in a filtered manner from the cab into the air-guiding element, can be mixed in the air-guiding element and can be guided in the sealed region into the air-conditioning chamber. The mixed air can subsequently pass through the air-conditioning-system assembly where it is either heated or cooled. The air-conditioned air is then discharged at an increased speed into the outlet chamber, from where the air-conditioned air is conducted into the cab via the ventilation opening.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
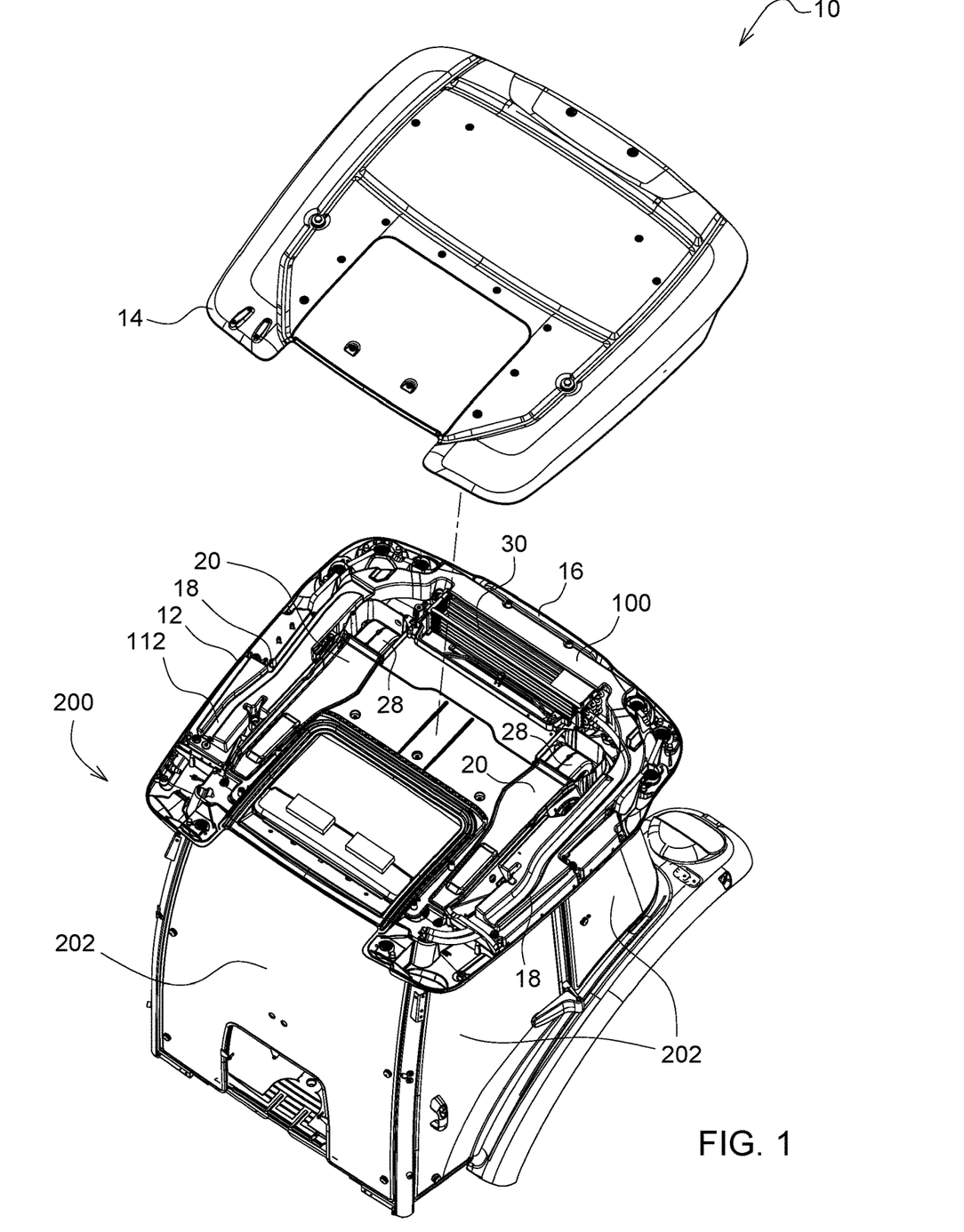
FIG. 1 shows a perspective view of a first embodiment of a roof structure.

FIG. 1 shows a schematic illustration of a first embodiment of the roof structure for an agricultural vehicle. The roof structure comprises a lower roof assembly 12 and an upper roof assembly 14. An air-conditioning chamber 16 is formed in the lower roof assembly 12, wherein the upper roof assembly 14 is fixedly or releasably fastenable to the lower roof assembly 12 in order to surround the air-conditioning chamber 16. The roof structure 10 furthermore comprises two inlet chambers 18 for non-air-conditioned air and two outlet chambers 20 for air-conditioned air, wherein the inlet chambers 18 and the outlet chambers 20 between the lower roof assembly 12 and the upper roof assembly 14 are designed as chambers which are separated from each other. Each inlet chamber comprises a fresh air opening 22 (see FIG. 2) for supplying fresh air and a circulation opening 24 (see FIG. 2) for supplying recirculated air. The roof structure 10 comprises an air-guiding element 100 which is arranged in the inlet chambers 18. The air-guiding element 100 is arranged here at the fresh air openings 22 (see FIG. 2) and at the circulation openings 24 (see FIG. 2) and at the air-conditioning chamber 16 in such a manner that a region sealed in relation to an external environment is formed. In addition, the air-guiding element 100 has a cable duct 112 in which connecting lines, i.e., cables or hoses, are arranged.

In addition, two second fans 28 and an air-conditioning-system assembly 30 are arranged in the air-conditioning chamber 16, wherein the second fan 28 has a second fan inlet and a second fan outlet. In the operating state, the second fan inlet can suck up air from the air-conditioning chamber 16 and the second fan outlet can discharge air into the outlet chamber 20. The air outlet (reference sign 106, see FIGS. 3 and 4) of the air-guiding element 100 is arranged at the air-conditioning-system assembly 30 in such a manner that the filtered fresh air and the recirculated air can be guided directly onto the surface of the air-conditioning-system assembly 30.

FIG. 1 in particular also shows a schematic illustration of a first embodiment of the cab 200 for an agricultural vehicle, comprising a roof structure 10. The cab 200 comprises the above-described roof structure 10 and side walls 202, here four pieces, made from glass. The side walls 202 are fastened to the lower roof assembly 12 or are releasably connected thereto.

Figure 2:
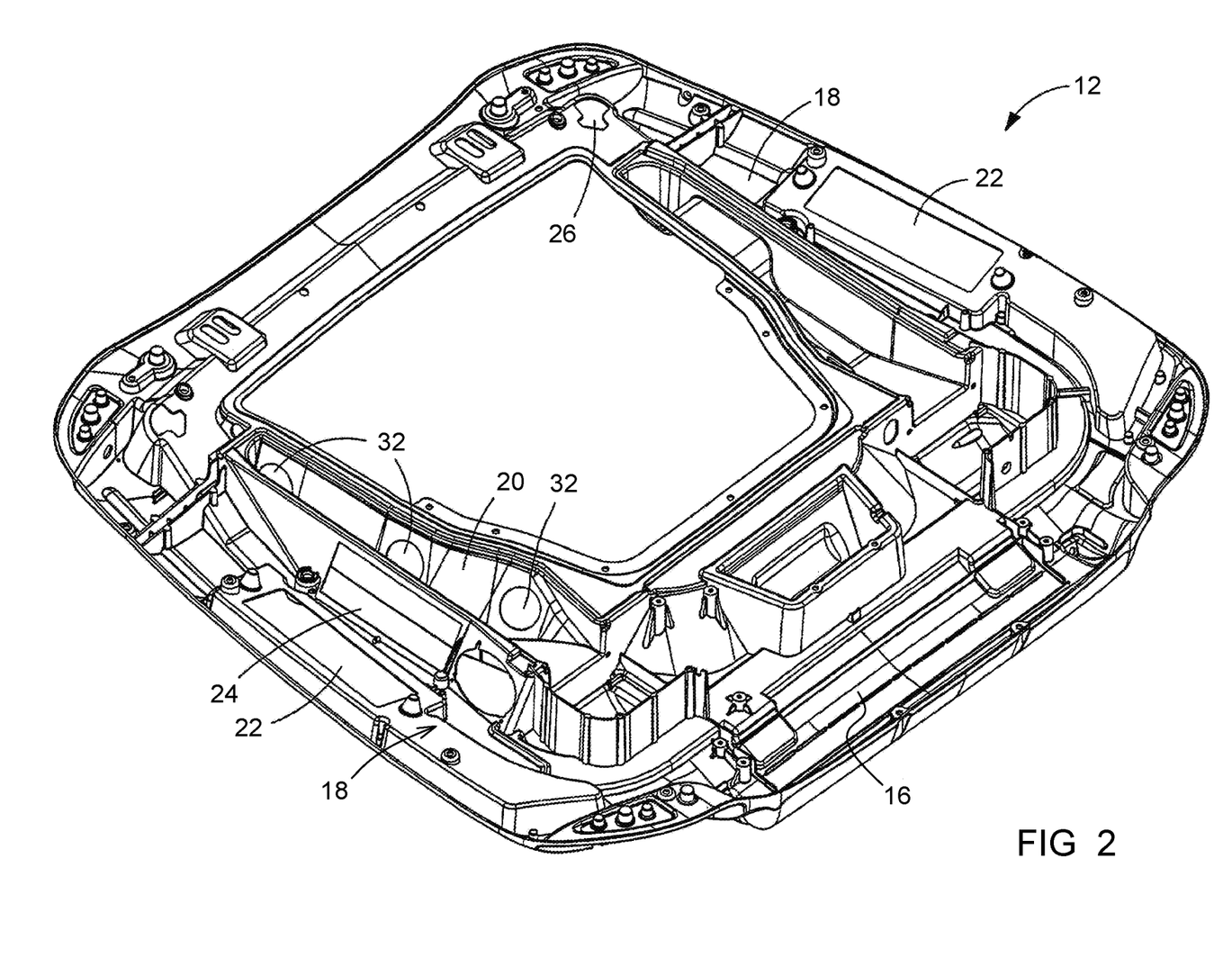
FIG. 2 shows a perspective view of a lower roof assembly of the roof structure.

FIG. 2 shows a schematic illustration of the lower roof assembly 12 of the roof structure 10. The lower roof assembly shown in FIG. 2 substantially corresponds to the lower roof assembly shown in FIG. 1, and therefore only the differences will be discussed below. The lower roof assembly comprises two inlet chambers 18 each having a fresh air opening 22 and a circulation opening 24. The fresh air and the recirculated air can be sucked up with the second fan 28 (see FIG. 1), can be mixed in the air-guiding element 100 (FIGS. 1, 3 and 4) and can be guided in the sealed region to the air-conditioning chamber 16. In addition, the air which has been air-conditioned by means of the air-conditioning-system assembly can be guided out of the air-conditioning chamber by means of the second fans 28 into the outlet chamber 20 and via the ventilation openings 32 into the cab.

Figure 3:
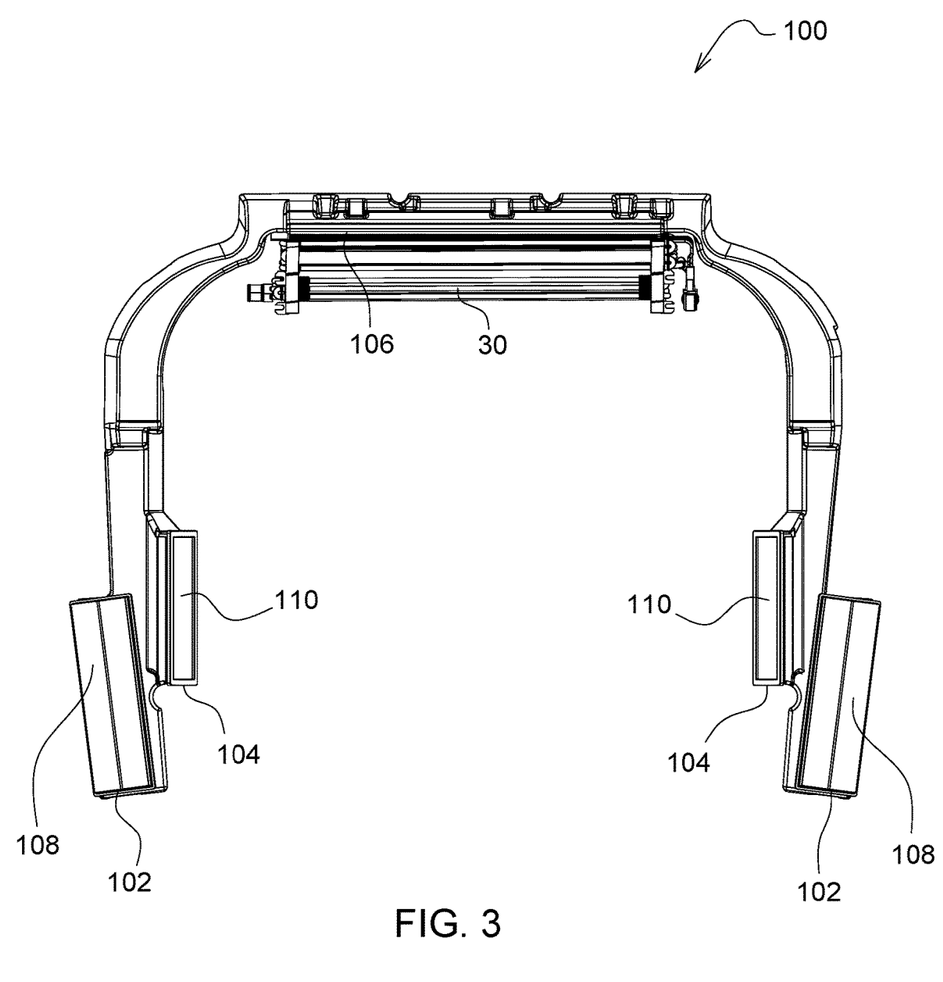
FIG. 3 shows a schematic illustration of an air-guiding element of the roof structure.

FIG. 3 shows a schematic illustration of the air-guiding element 100 of the roof structure 10. The air-guiding element 100 shown in FIG. 3 substantially corresponds to the air-guiding element 100 shown in FIG. 1, and therefore only the differences will be discussed below.

The air-guiding element 100 has two fresh air inlets 102 and two circulation inlets 104 and an air outlet 106. In the fitted state, the fresh air opening 22 is connected to the fresh air inlet 102 and the circulation opening 24 to the circulation inlet 104 in such a manner, and the air outlet 106 is arranged at the air-conditioning chamber 16 in such a manner, that the fresh air and the recirculated air can be supplied to the air-guiding element, can be mixed in the air-guiding element 100 and can be guided in the sealed region from the fresh air opening 22 and the circulation opening 24 to the air-conditioning chamber 16. In order to filter the fresh air and recirculated air supplied to the air-guiding element, a first filter element 108 is removably arranged at each of the fresh air inlets 102 and a second filter element 108 is removably arranged at each of the circulation inlets 104.

Figure 4:
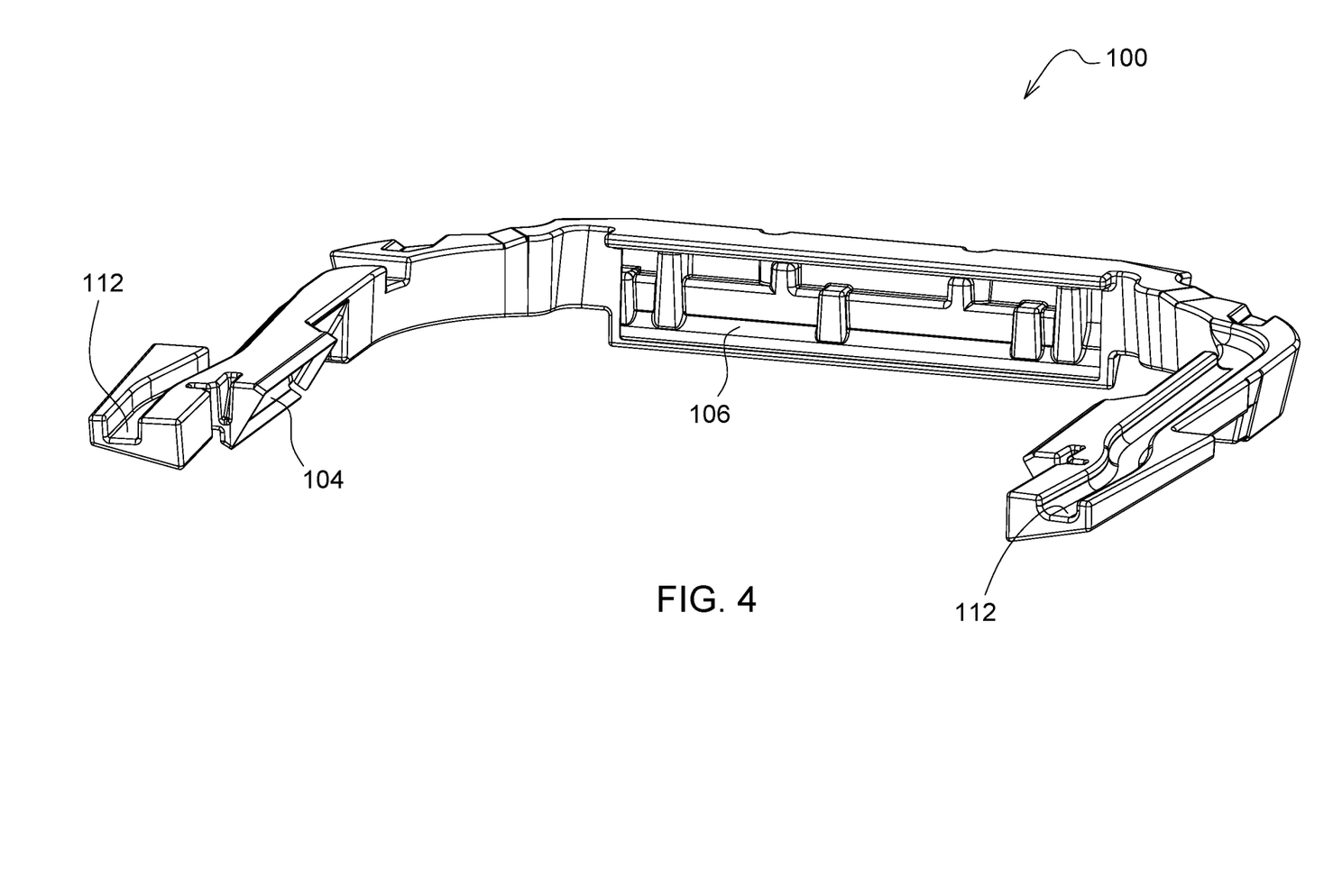
FIG. 4 shows a perspective view of the air-guiding element of the roof structure.

FIG. 4 shows a perspective illustration of the air-guiding element 100, which is shown in FIG. 3, of the roof structure 10.

Figure 5:
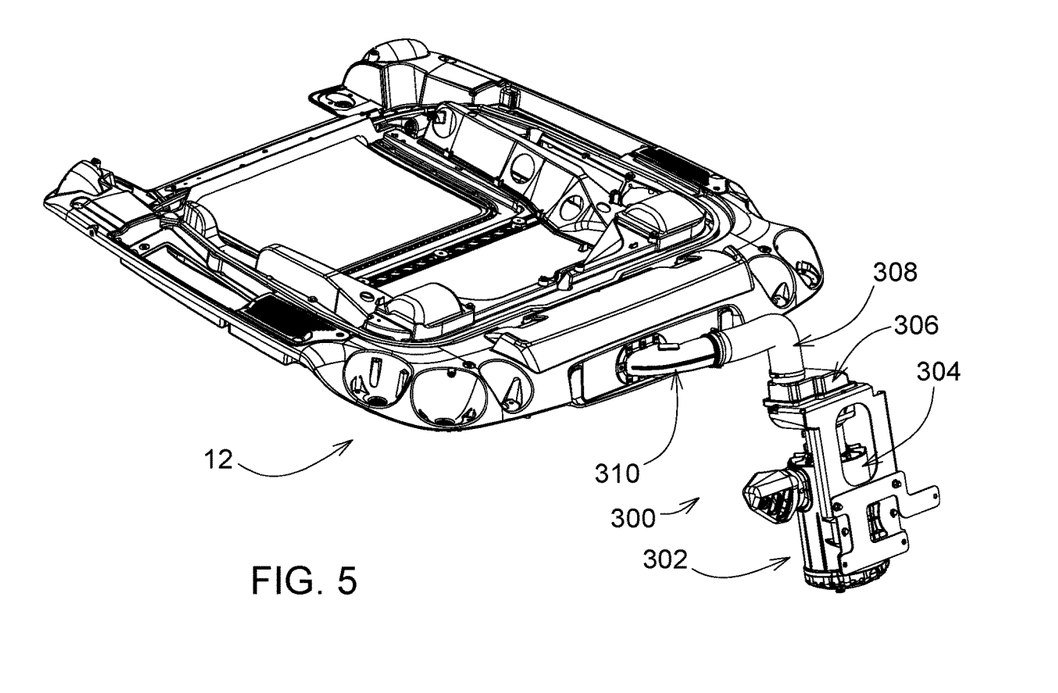
FIG. 5 shows a perspective illustration of a further embodiment of a roof structure.

FIG. 5 shows a perspective illustration of a further embodiment of a roof structure 10, in particular the lower roof assembly 12 with the filter arrangement 300. The lower roof assembly 12 shown in FIG. 5 substantially corresponds to the lower roof assembly 12 shown in FIGS. 1 and 2, and therefore only the differences will be discussed below. The filter arrangement 300 comprises a line 308, a first filter element 302, in particular with a filter, a holder 304 with a fastening element, a first fan 306 and a coupling element 310. The line 308 is connected to the coupling element 310, in particular is fastened to the coupling element 310, and therefore they are connected in terms of flow. The coupling element 310 is releasably connected to the fresh air inlet 22 of the lower roof assembly 12 or is fastened to said fresh air inlet, but can also be fixedly connected.

Figure 6:
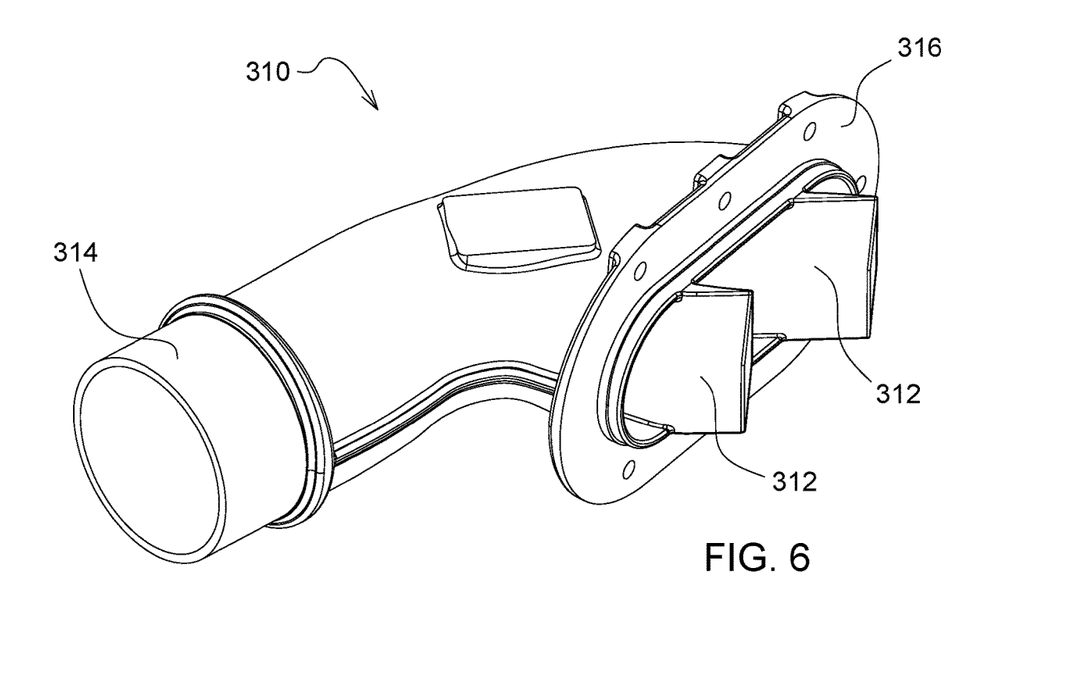
FIG. 6 shows a perspective view of the coupling element.

FIG. 6 shows a perspective illustration of the coupling element 310. The coupling element 310 shown in FIG. 6 substantially corresponds to the coupling element 310 shown in FIG. 5, and therefore only the differences will be discussed below. The coupling element 310 is fastenable to the lower roof assembly by means of a fastening element, here a coupling flange 316. The line 308 is connectable to the coupling element 310 via a connecting branch 314.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A cab for an agricultural vehicle, comprising:
   a side wall;
   a roof structure coupled to the side wall, the roof structure comprising:
      an upper roof assembly;
      a lower roof assembly separate from the upper roof assembly;
      an air-conditioning chamber formed in the lower roof assembly, the upper roof assembly being connectable to the lower roof assembly to surround the air-conditioning chamber;
      an inlet chamber and an outlet chamber for air-conditioned air, wherein the inlet chamber and the outlet chamber between the lower roof assembly and the upper roof assembly comprise chambers separated from each other;
      a circulation opening for supplying recirculated air arranged at the inlet chamber;
      an air-guiding element arranged in the inlet chamber, at the circulation opening, and at the air-conditioning chamber, wherein a region is sealed in relation to an external environment; and
      a fresh air opening for supplying fresh air formed at the inlet chamber or the air-conditioning chamber;
      wherein the air-guiding element is a sealed region that connects the inlet chamber and the air-conditioning chamber that is sealed from regions inside and outside the roof structure.

2. The cab of claim 1, further comprising a filter arrangement located at the fresh air opening or the fresh air inlet.

3. The cab of claim 1, further comprising a second fan arranged in the air-conditioning chamber or the outlet chamber.

4. The cab of claim 1, further comprising an air-conditioning-system assembly arranged in the air-conditioning chamber or at the outlet chamber.

5. A roof structure of an agricultural vehicle, comprising:
   an upper roof assembly;
   a lower roof assembly separate from the upper roof assembly;

an air-conditioning chamber formed in the lower roof assembly, the upper roof assembly being connectable to the lower roof assembly to surround the air-conditioning chamber;

an inlet chamber and an outlet chamber for air-conditioned air, wherein the inlet chamber and the outlet chamber between the lower roof assembly and the upper roof assembly comprise chambers separated from each other;

a circulation opening for supplying recirculated air arranged at the inlet chamber;

an air-guiding element arranged in the inlet chamber, at the circulation opening, and at the air-conditioning chamber, wherein a region is sealed in relation to an external environment;

a fresh air opening for supplying fresh air formed at the inlet chamber or the air-conditioning chamber; and a filter arrangement located at the fresh air opening;

wherein the air-guiding element is configured as a closed duct, and the air-guiding element is arranged at the fresh-air opening and at the circulation opening and in the air conditioning chamber such that the air-guiding element forms a region in the inlet chamber and in the air-conditioning chamber that is sealed off from regions inside and outside the roof structure.

6. The roof structure of claim 5, wherein the air-guiding element comprises:
a fresh air inlet for supplying the fresh air;
a circulation inlet for supplying the recirculated air; and
an air outlet for letting out mixed air.

7. The roof structure of claim 6, wherein the fresh air opening is connected to the fresh air inlet and the circulation opening is connected to the circulation inlet.

8. The roof structure of claim 7, wherein the air outlet is arranged at the air-conditioning chamber such that the fresh air and the recirculated air are mixable in the air-guiding element, and are guided in the sealed region from the fresh air opening and the circulation opening to the air outlet.

9. The roof structure of claim 7, wherein the filter arrangement comprises a first filter element arranged at the fresh air inlet such that the fresh air that enters the fresh air inlet must pass through the first filter element before being mixable with the recirculated air in the air-guiding element.

10. The roof structure of claim 9, further comprising a second filter element removably arranged at the circulation inlet such that the recirculated air that enters the circulation inlet must pass through the second filter element before being mixable with the fresh air in the air-guiding element.

11. The roof structure of claim 5, wherein the filter arrangement and the air-guiding element or the filter arrangement and the roof structure are connected by a coupling element.

12. The roof structure of claim 5, wherein the air-guiding element comprises a cable duct configured to hold connecting lines for an air-conditioning system.

13. The roof structure of claim 5, further comprising a second fan arranged in the air-conditioning chamber or the outlet chamber.

14. The roof structure of claim 13, further comprising an air-conditioning-system assembly arranged in the air-conditioning chamber or at the outlet chamber.

15. The roof structure of claim 14, wherein the second fan comprises a fan inlet and a fan outlet, wherein the fan inlet is configured to suction air from the air-conditioning chamber or the fan outlet discharges air into the outlet chamber.

16. The roof structure of claim 14, wherein the air outlet is arranged at the air-conditioning-system assembly.

17. The roof structure of claim 5, wherein an air outlet is arranged at an air-conditioning chamber such that the fresh air and the recirculated air are mixable in the air-guiding element, and are guided in the sealed region from the fresh air opening and the circulation opening to the air outlet.

18. The roof structure of claim 17, wherein the filter arrangement comprises a first filter element arranged at the fresh air opening such that the fresh air that enters the fresh air opening must pass through the first filter element before being mixable with the recirculated air in the air-guiding element.

19. The roof structure of claim 18, further comprising a second filter element removably arranged at the circulation opening such that the recirculated air that enters the circulation opening must pass through the second filter element before being mixable with the fresh air in the air-guiding element.

* * * * *